Jan. 7, 1958   J. G. ELSE ET AL   2,819,025
VALVE MEANS
Filed Oct. 1, 1954   2 Sheets-Sheet 2
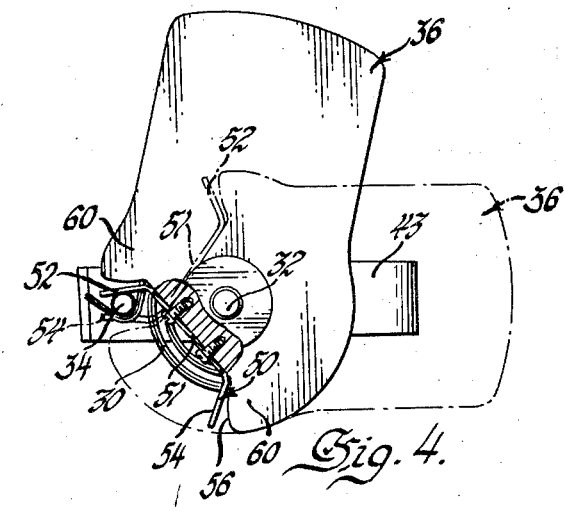
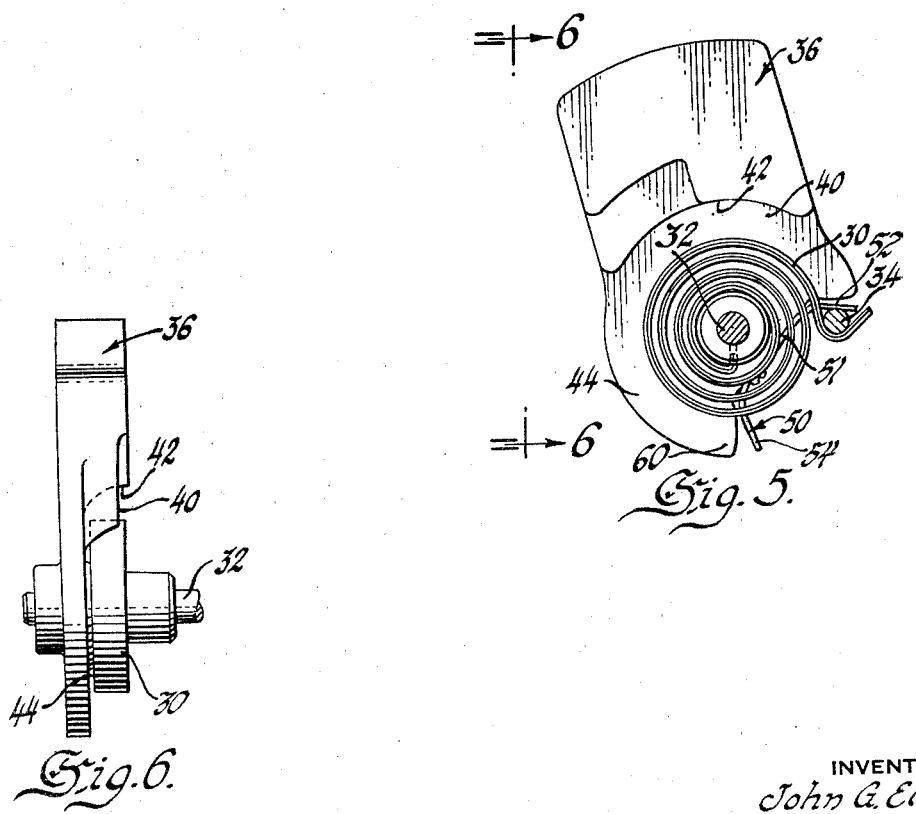
INVENTORS
John G. Else &
BY Donald S. Pike
ATTORNEY

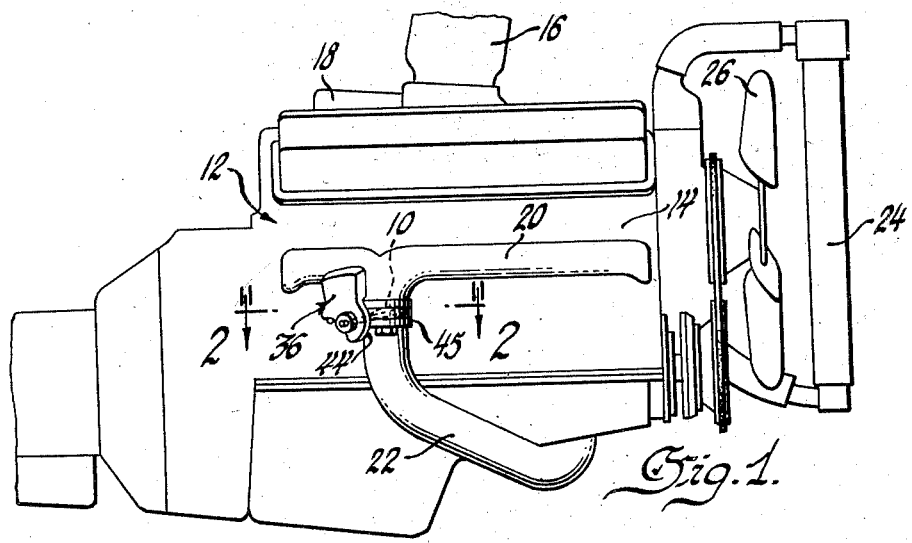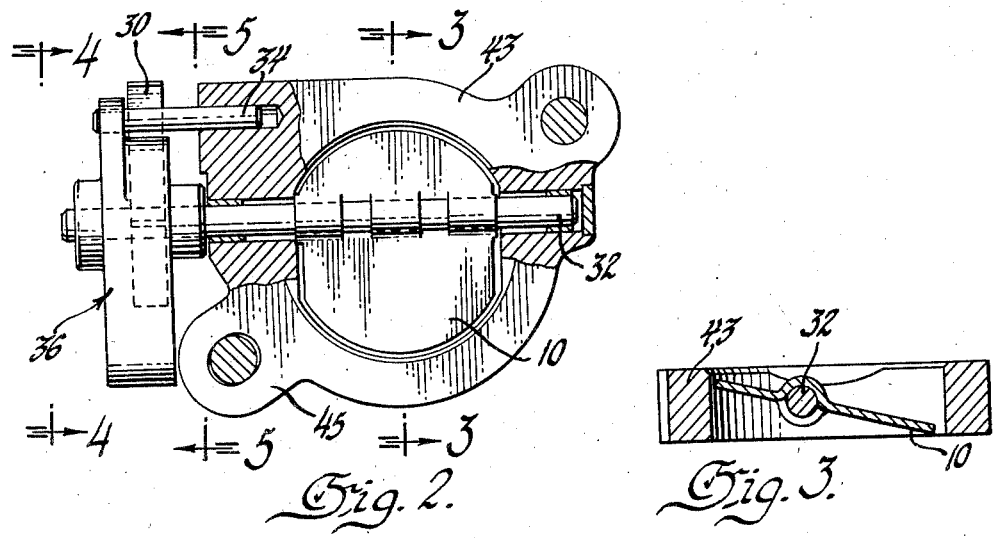

United States Patent Office 2,819,025
Patented Jan. 7, 1958

2,819,025

VALVE MEANS

John G. Else, Royal Oak, and Donald S. Pike, Whitmore Lake, Mich., assignors to General Motors Corporation, Detroit, Mich., a corporation of Delaware Application October 1, 1954, Serial No. 459,710

1 Claim. (Cl. 236—101)

The present invention relates to internal combustion engines and more particularly to means for heating the induction systems therefor.

It has been found desirable to heat a combustible charge in the induction system of an internal combustion engine when the engine is operating at subnormal temperatures. Although the application of this heat reduces the tendency for the fuel particles to precipitate out of the charge, it also reduces the volumetric efficiency and the engine output. Accordingly, when the engine approaches normal operating temperatures and the necessity for heating the charge decreases, a thermostatically actuated heat valve responsive to engine temperatures may reduce the amount of heat applied to the charge as the engine approaches normal operating temperatures.

The thermostatic element is usually mounted on the exterior of the engine in heat exchanging relation with the engine exhaust system. Thus although the element is responsive to the engine temperature, it has also been responsive to the ambient air. Accordingly, even though the engine has been fully heated, a blast of cold air may strike the thermostat and cause a preheating of the charge even though the engine is hot.

It is therefore proposed to provide a thermostatic control for the exhaust heat valve which will make the thermostat more closely responsive to the engine temperature. This is to be accomplished by placing the thermostat between a radiation shield and the exhaust system. In the present instance this radiation shield is an integral part of a counterbalance weight that opposes the thermostat for biasing the heat valve toward the open position and it preferably includes a recessed portion that receives the thermostat. When the engine is cold and the exhaust valve is closed, there will be very little exhaust gas flowing past the valve. As a consequence, the amount of heat transferred to the exhaust system in the vicinity of the thermostat will be small and the heat radiated and/or conducted to the thermostat will also be small. However, when the valve is open, there will be a large volume of exhaust gas passing the valve. As a result, the heat conducted and radiated to the thermostat will be greater. Thus by providing a radiation shield around the thermostat at all times, the heat will be retained in and around the thermostat at all times. Accordingly, once the valve opens, the heat applied thereto will be greater and the thermostat will be hotter so that the valve will remain open until the engine cools off, i. e., the temperature of the thermostat will be more closely related to the engine temperature.

In order to prevent the heat valve traveling beyond its fully opened or fully closed position, stop means may be provided for limiting the amount of movement of the valve. Vibrations present in the engine and surges of exhaust gases in the exhaust system have caused movement of the heat valve which have caused the stop means to produce a series of objectionable rattles.

It is therefore proposed that the stop means include a resilient member which will cushion any impact that would result from movement of the valve so as to prevent any objectionable rattles occurring. In the present instance the resilient member is a spring which has the center thereof secured to the counterweight with the opposite ends thereof projecting outwardly to form cantilever spring arms. Each arm may be positioned so that one of them will strike the stop when the valve is in one of its extreme positions.

In the two sheets of drawings:

Figure 1 is a side view of an engine showing an exhaust heat control valve embodying the present invention.

Figure 2 is a cross sectional view taken substantially along the plane of line 2—2 in Figure 1.

Figure 3 is a cross sectional view taken substantially along the plane of line 3—3 in Figure 2.

Figure 4 is an end view of the exhaust heat valve taken substantially along the plane of line 4—4 in Figure 3.

Figure 5 is a cross sectional view taken substantially along the plane of line 5—5 in Figure 2.

Figure 6 is a side view taken substantially along the plane of line 6—6 in Figure 5.

Referring to the drawings in more detail, this invention may be incorporated in an exhaust heat valve 10 for installation on any suitable engine 12. In the present instance the engine is of the so-called V-type having a cylinder block 14 which includes a pair of angularly disposed cylinder banks with cylinder heads secured thereto for closing the upper ends of the cylinders to form combustion chambers.

An induction system having a carburetor 16 and an intake manifold 18 may be disposed in the space between the two banks of cylinders for distributing a combustible charge to each of the combustion chambers. The intake manifold 18 may include a plurality of distribution passages that extend therethrough to form ports on the sides of the manifold 18 that will register with intake ports in the cylinder head. Thus if the carburetor 16 is mounted on the intake manifold 18, a combustible charge may be carried to the various cylinders by the distribution passages.

Exhaust manifolds 20 may extend along the opposite sides of the engine 12 for collecting the exhaust gases from the combustion chambers. One or more exhaust pipes 22 may be provided that communicate with the exhaust manifolds 20 for discharging the exhaust gases into the atmosphere.

An engine cooling system having a radiator 24 may be provided for reducing the operating temperatures of the engine 12. A fan 26 may be disposed behind the radiator 24 to draw air through the radiator 24 and blow it across the engine 12.

A heat exchanger may be provided in the intake manifold 18 in heat exchanging relation with the distribution passages in the intake manifold so as to preheat the charge flowing therethrough. The present heat exchanger comprises an exhaust crossover passage that extends transversely through the intake manifold 18 so that the opposite ends of the passage form ports in the sides of the intake manifold. Each of these ports are positioned to communicate with at least one of the exhaust passages in the cylinder heads. Thus the exhaust gases in one exhaust manifold may flow into the other exhaust manifold by flowing through an exhaust passage in one head into the heat exchanger and out through an exhaust passage in the other head.

A heat valve 10 may be provided for controlling the flow of exhaust gases through the heat exchanger. In the present instance the heat valve 10 is positioned in one of the exhaust pipes 22 adjacent an exhaust manifold 20. When the exhaust valve 10 is in the open position, the exhaust gases may flow out of the exhaust manifolds 20 and into the atmosphere. However, when the valve 10 is closed or partially closed, it will block the flow of exhaust gases out of the exhaust manifold 20 and the gases will back up in the exhaust manifold and flow into the crossover passage or heat exchanger where they will heat the walls of the distribution passages and the charge flowing therethrough.

Since the amount of heating required for the charge is a function of engine temperature, the valve 10 is preferably positioned in response to engine temperatures. Accordingly, a thermostatic element such as a spiral spring 30 may be mounted on the exhaust manifold 20 in heat exchanging relation therewith. A counterweight 36 may be secured on the valve shaft 32 to oppose the spring tension and bias the valve toward the open position. The weight 36 may project upwardly when the valve 10 is open and horizontally when the valve 10 is closed. An enlarged hub may project from the weight toward the housing concentric with the shaft 32. This hub may have one or more slots therein for receiving the inner end of the thermostatic spring 30. The outer end of the spring 30 may have a hook thereon that will engage a pin 34 projecting from the manifold. Thus when the spring 30 is cold, it will contract and hold the valve closed to divert the gases into the heat exchanger. However, as the engine 12 becomes hot and heats the spring 30, the spring 30 will relax and the counterweight 36 will swing toward the horizontal position and open the valve 10.

In the present instance the counterweight 36 is a solid metal arm having a circular recessed portion 40 which forms a housing for enclosing the thermostatic spring element 30. This recess 40 may include a plane inner surface 44 that is disposed normal to the shaft 32 and parallel to an edge of the spring 30. Thus the surface 44 will be disposed adjacent the exhaust manifold so as to form a space having very little, if any, air circulating therethrough. If the valve shaft 32 is skew to the axis of the engine 12, this space will be behind the exhaust system and the amount of air striking the thermostat will be small. When the valve is closed there will be very little exhaust gas flow through the exhaust valve and the temperature of the spring will be of a low temperature corresponding to the cold portions of the engine adjacent thereto.

When the engine 12 becomes hot and heats the spring 30 sufficiently to open the valve 10, the weight 36 will swing down into a horizontal position. The valve will open and allow a large volume of hot exhaust gases to flow therepast. This will increase the amount of heat transferred to the structure around the thermostatic spring 30. Since the spring is disposed between this structure and a radiation shield, any heat that is radiated and/or conducted away from this structure toward the thermostat will be retained in and around the thermostat by the radiation shield. Therefore once the valve opens the thermostat will become hotter and it will retain the valve closed until the engine cools off.

It can thus be seen that when the engine 12 is cold, the position of the valve 10 will be determined by the temperature of the cold engine structure surrounding the thermostat thereby insuring an adequate heating of the incoming charge. However, when the engine 12 becomes hot and the valve 10 moves to the open position, the thermostat will be hot enough to retain the valve open until the engine cools off.

In order to limit the amount of opening and closing movement of the heat valve 10, a stop may be provided. The stop means may include the pin 34 if it is positioned to engage the counterweight 36. In the present instance a relatively thin spring 50 has its middle portion 51 secured to the weight 36 so the opposite ends may be bent outwardly to form a pair of divergent arms 52 and 54. One of these arms 52 may be positioned to strike one side of the pin 34 when the valve 10 is closed while the other arm 54 may be positioned to strike the opposite side of the pin 34 when the valve 10 is open. This will provide a resilient stop that will limit the movement of the valve 10 without producing any solid metal to metal contact. Thus if there is any fluttering of the valve 10 or other vibrations thereof, it will be resiliently absorbed by the spring 50 and thus prevent any audible rattling.

It has been found preferable to mount the spring 50 in an indentation 56 in a side of the recessed portion 51. Ears 60 may then be extended upwardly around the arms 52 and 54 forming the ends of the spring 50 as this will further increase the shielding action around the thermostatic spring 30. It is desirable that the ears 60 be in spaced relation to the arms 52 and 54 as this will enhance the resilient deflection thereof.

Various changes and modifications of the embodiment of the invention described herein may be made by those skilled in the art without departing from the spirit and principles of the invention.

What is claimed is:

An exhaust manifold heat valve comprising a housing having a passage therethrough, a valve shaft extending through said passage with one end thereof projecting from said housing, a valve member mounted on said shaft for opening and closing said passage, a weight secured to said end of said shaft for biasing said valve member towards the open position and having a hub disposed concentrically about said shaft and having an outside diameter greater than the outside diameter of said shaft, the portion of said weight adjacent said shaft being recessed to form a plane wall normal to said shaft and immediately adjacent said spring and an arcuate surface concentric about said shaft, a thermostatic coil spring disposed in said recess adjacent said housing and having one end thereof fastened to said hub and the other end thereof fastened to a pin projecting from said housing for biasing said valve towards the closed position, said wall forming a radiation shield adapted to confine the heat radiated from said housing to the space in and around said spring, a U-shaped spring stop disposed in an arcuate opening formed in said plane wall, the center of said spring being secured to said weight at the center of said opening, the opposite ends of said spring forming a pair of divergent arms positioned to strike said pin when said valve member is in either of its extreme positions.

References Cited in the file of this patent
UNITED STATES PATENTS

| | | |
|---|---|---|
| 1,570,602 | Hobbs | Jan. 19, 1926 |
| 2,005,869 | Meinzinger | June 25, 1935 |
| 2,226,011 | Murphy | Dec. 24, 1940 |
| 2,564,112 | Kittler | Aug. 14, 1951 |